United States Patent [19]

Martenson et al.

[11] Patent Number: 4,931,211

[45] Date of Patent: Jun. 5, 1990

[54] PROCESS OF EXPANDING OBSIDIAN

[75] Inventors: Alfred J. Martenson, Richland; William J. Johnson, Kennewick, both of Wash.

[73] Assignee: Pyrofoam, Inc., Kennewick, Wash.

[21] Appl. No.: 878,098

[22] Filed: Jun. 24, 1986

[51] Int. Cl.$^5$ ............................................. C04B 20/06
[52] U.S. Cl. ............................... 252/378 R; 252/378 P
[58] Field of Search ......................... 252/378 P, 378 R

[56] References Cited

U.S. PATENT DOCUMENTS

| 2,501,698 | 3/1950 | Stecker | 252/378 |
| 2,501,699 | 3/1950 | Stecker | 252/378 |
| 2,602,782 | 6/1952 | Zoradi | 432/119 X |
| 2,621,160 | 12/1952 | Johnson et al. | 252/378 |
| 2,639,269 | 5/1953 | Dube | 252/378 |
| 3,456,933 | 7/1969 | Brouk | 252/378 X |

OTHER PUBLICATIONS

Kozu, "Thermal Studies of Obsidian . . . Japan", pp. 225–238 1929.
Mudd, "Industrial Minerals & Rocks" pp. 748–751 1949.

Primary Examiner—Ferris H. Lander
Attorney, Agent, or Firm—Robert Keith Sharp

[57] ABSTRACT

Obsidian having less than one percent of combined water is expanded to a volume many times the original by a two stage heating process carried out in at least one refractory-lined, rotary kiln. It is heated gradually by a first flame to a temperature of 1800–1900 F., then subjected to a second flame at a temperature of 2400–2500 F. for a very few minutes. The heating is carried out in the presence of dust which has a softening point considerably above those temperatures. The dust prevents the softened obsidian from sticking to itself or to the lining of the kiln. In some embodiments, the entire process is carried out in a single kiln with both flames entering the discharge end of the kiln, the first flame being directed toward the feed end and the second flame directed transversely or toward the discharge end. In another embodiment, the obsidian is gradually heated in a first kiln, then immediately fed to a second rotary kiln where the second flame enters the feed end and is directed toward the discharge end. In the second embodiment, combustion gases from the second kiln are recycled back to the first kiln to aid in the gradual heating step.

9 Claims, 1 Drawing Sheet

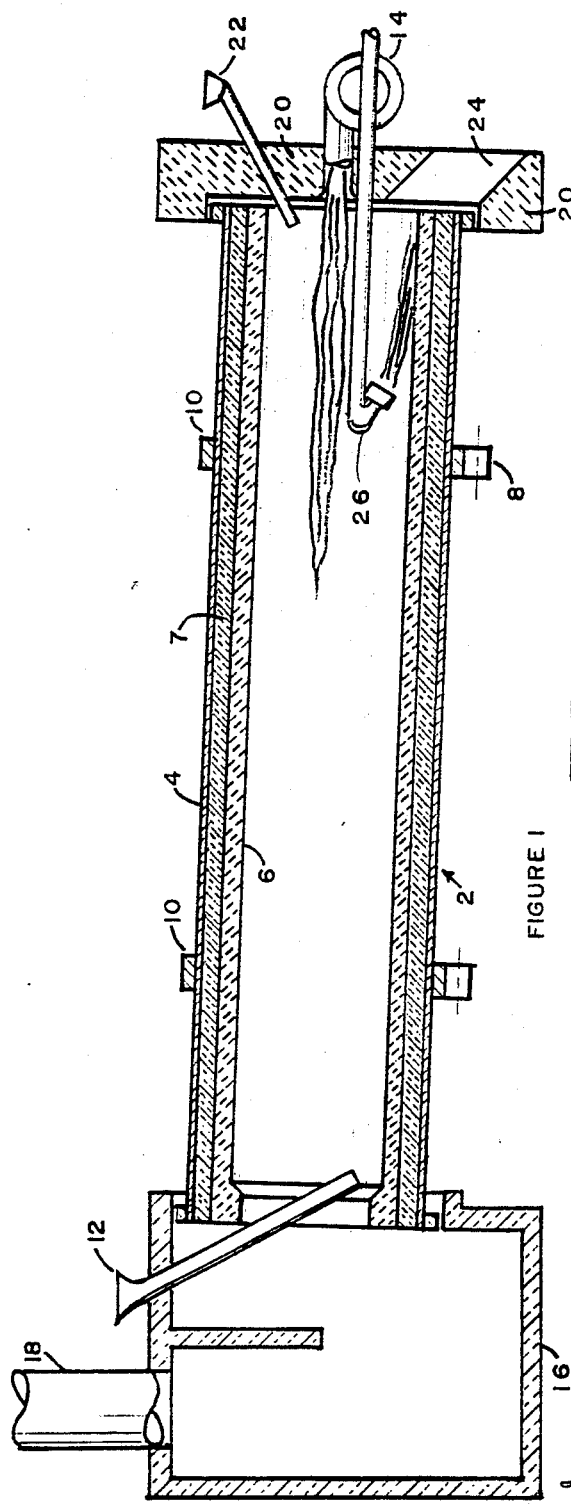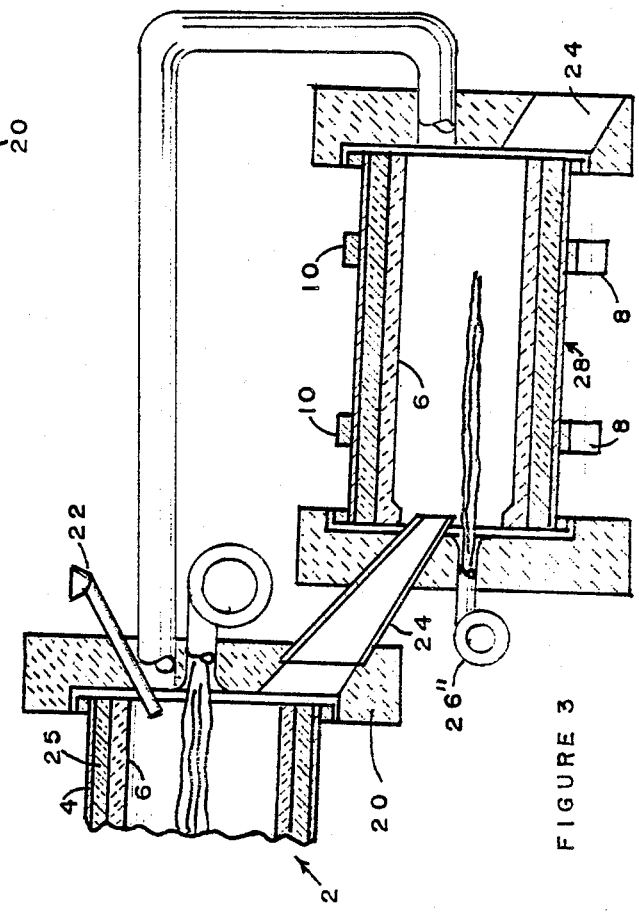

PROCESS OF EXPANDING OBSIDIAN

INTRODUCTION

This invention relates to a process of and apparatus for expansion of obsidian into a very light, glassy material with closed cells which can be bonded into useful products, e.g., insulating panels, and has excellent insulating properties combined with the inability to absorb water. It is fireproof and as the ability to stand temperatures up to 1900° F. without deterioration. At temperatures above 1900° F., it will partialy slump back to a more dense state.

BACKGROUND

There is much prior art dealing with the expansion of perlite. This is a variety of obsidian which contains over 2% combined water. Various methods of expansion are disclosed in the prior art. The commercial process involves heating the perlite ore to approximately 500° F. and then dropping it into a flame which is directed upwardly. When the ore reaches a temperature somewhere between 1400° F. and 1800° F., it expands very rapidly and is blown upward and out of the furnace by the exhaust gases.

Obsidian involved in this invention is obtained from a limited area in northern California. Similar material may be found elsewhere. Its principal components are as follows.

76.7% silica, 13.0% alumina, 1.37% iron, 0.42% calcium, 4.07% sodium, 3.93% potassium, 56 ppm barium, 316 ppm manganese, 25 ppm strontium, 550 ppm titanium. The approximate water content is 0.14%.

When this obsidian is heated to a high temperature, its volume increases by a factor of 20 to 25. The expanded product differs from expanded perlite in that the latter contains mostly open pores and therefore absorbs water. The material involved in the present invention produces an expanded product containing mostly closed pores and therefore does not absorb water. An attempt was made to expand it by the method referred to above, but this attempt failed since this obsidian must be heated to a temperature of at least 1900° F. before it will expand. Furthermore, it expands very slowly while the rock is going through the viscous state and could not be supported by the fire blast.

An attempt was made to expand this obsidian in a fluidized bed at 2000° F. This process also failed since the obsidian pieces conglomerated while in the viscous state and large clinkers fell to the bottom of the furnace. Some success was obtained with a rotating kiln made of Inconel, the obsidian being fed into the upper end of a inclined kiln and a flame being introduced near the lower end. The expanded product did not stick to the Inconel and an output of 30 pounds/hour was achieved in an extended run of 36 hours. However, the Inconel kiln failed soon thereafter. The Inconel is too expensive for a large kiln and the operating temperature of 2400° F. is too close to its operating limit of 2400° F.

It was then decided to try a rotating kiln lined with firebrick. However, it was learned from tests of stationary furnaces and later in a rotating kiln that the expanding obsidian sticks to the brick. It was also found that the obsidian would stick to itself, thereby producing large clinkers instead of the free-flowing homogeneous product.

SUMMARY OF THE INVENTION

It has been found that a dust having a melting or softening point considerably above the softening pont of the obsidian will prevent the obsidian from sticking to the walls and also prevent the formation of clinkers. Early tests, when the dust and obsidian were introduced together into the upper end of a short, inclined, rotating kiln with the flame introduced at the lower end and the combustion gases passed to exhaust from the upper end, showed that the dust was swept out the exhaust before reaching the product end of the kiln, thereby making it relatively ineffective.

Next, a kiln was built with the flame (introduced under pressure) and the exhaust at the same (lower) end of the kiln, with the obsidian and dust introduced together at the upper end. In this arrangement, the dust coated the entire internal surface of the kiln. A good product was obtained with no sticking. However, the kiln was inefficient, i.e., it produced an unacceptably low output of expanded obsidian. Most of the gas made the turn toward the exhaust stack rather than heating the feed end of the kiln.

The preferred procedure, which proved successful with the short kiln was the introduction of obsidian and dust at the upper end of the kiln, the introduction of the flame and additional dust at the lower end of the kiln, and the withdrawal of exhaust gases together with some entrained dust at the upper end. This exhaust was passed through a dust collector on its way to the stack and much of the dust was recovered. The research kiln was only 8 feet long, with an inside diameter of 2 feet, and had an output of 450 pounds per hour of expanded obsidian in the form of free, dust-coated granules. The product was run over a rotating or vibrating sieve for further recovery of dust. This dust, together with that recovered from the dust collector in the exhaust system was recycled to the kiln.

Powdered aluminum oxide and powdered talc have been used successfully as anti-sticking dust but many finely divided materials of sufficiently fine particle size and with a softening point above 2600° F. could be substituted, since operation depends on the physical effect of coating the kiln wall and the obsidian with the dusty material.

While it is usually best to introduce some dust continually into the discharge end of the kiln, it is sometimes possible to introduce the main supply only with the incoming obsidian feed, keep a close watch on the behavior of the outgoing product and, if sticking is seen to be occurring, to inject additional dust into the flame at the discharge end of the kiln.

It was found that the problem of coating the kiln wall and the expanding obsidian with dust became simpler when a long rotating kiln was used. For example, a kiln was constructed with an internal diameter of 2 feet and a length of 24 feet. The intent of the redesign was to produce a more energy efficient process where a greater fraction of the heat of combustion was transferred to the obsidian, thereby decreasing the stack losses. With this longer kiln, sufficient heating could be obtained with a relatively lazy flame and there was less tendency to blow out the dust. A separate dust feeder was installed at the same end where the obsidian ore was introduced (the high end near the exhaust). With this arrangement, sufficient dust traveled the full length of the kiln.

Although the long kiln was far more energy efficient than the short kiln, and the problem of dust distribution was minimized, the long kiln did present a new problem which was not evident in the short kiln. It was found that the hot spot in the kiln was not near the burner as expected but rather approximately 7 feet from the burner. When the temperature was high enough (approximately 2100° F.) to induce adequate expansion of the obsidian, it was found that most of the expansion occurred at the hot spot and during the few additional minutes required to exit the kiln, much sticking occured. Even with the addition of large amounts of dust, it was found that the production of large klinkers could not be avoided and that furthermore, sticking to the wall of the kiln was prevalent. On the other hand, if the temperature was lowered to the point where no sticking occurred, a low quality product resulted due to insufficient expansion. Although the process had worked well with the inefficient, short kiln, the results were poor with the efficient, long kiln.

The trick to avoid sticking and yet accomplish good expansion is to move the hot spot near the exit of the kiln so that the product leaves the kiln almost immediately after it undergoes its maximum expansion. Three methods were discovered for accomplishing this purpose. Each of these methods has worked well and each has certain advantages and disadvantages.

The first solution to the problem of sticky obsidian in long kilns was to introduce a second, backwards firing burner as illustrated in FIG. 1. Most of the heating of the obsidian ore is accomplished by the main burner which brings it to a temperature of approximately 1800° F. during a travel time of about 15 to 30 minutes. This hot ore then encounters the blast from the secondary burner which is now firing in the same direction as the movement of the ore. This heats the ore to a temperature of 2400° F. to 2500° F. where it expands in 3 or 4 minutes and is then blown from the kiln before there is time to form klinkers. In the experiments run to date, very high quality product was obtained at good volume rates. In order to achieve continuous, safe operation, it is necessary that the gas line for the secondary burner be surrounded by a concentric air line so that the air cools the gas and the two pipes. Mixing of the air and the gas should occur right at the burner head so that there is no combustible mixture to explode. Finaly, the two concentric pipes should be made of a ceramic material to avoid oxidation or softening. The feasibility of this concept was proven with cast iron pipes but the ceramic burner system would be necessary for commercial operation.

The second solution used for solving the problem of sticking obsidian in the long kiln was to introduce a secondary burner firing across the kiln at the product end as shown in FIG. 2. This does not offer the advantage of blowing the expanded obsidian from the kiln but it does move the hot spot to the product end of the kiln and it is very simple and safe. Continuous running for several days at product rates of 800 pounds per hour have been achieved with the 24 foot kiln. The energy consumption per pound of product was only one fourth of that used in the 8 foot kiln. At the present time, this is the preferred solution although the solution with the backwards firing, secondary burner has the best potential.

The third solution was to build two kilns. The first kiln (24 feet long) heated the obsidian ore to approximately 1800° F. where no expansion occurs. The hot obsidian was fed directly into a six foot long, secondary kiln which had a nearly uniform temperature of 2400° F. For this secondary kiln, the hot obsidian, the gas flame, and the dust were injected at the upper end of the inclined, rotating cylinder and the product and exhaust exited from the lower end. In this way, expanded obsidian would leave quickly, thereby minimizing the sticking problem. There was a considerable advantage associated with injecting the flame and the feed at the same end since the expanded obsidian tended to be blown out of the kiln while the obsidian which had not as yet expanded moved more slowly. Of course, this secondary kiln was not energy efficient since very little cooling of the combustion gas occurred. This problem was solved by piping the exhaust gas from the secondary kiln back to the lower end of the primary kiln where it contributed to the preheating of the obsidian ore. This solution has the advantage that the preheating and expansion phases of the operation could be separately controlled, thereby optimizing the properties of the product. The big disadvantage was the complexity. Two separate kilns together with duplicate combustion systems and instrumentation were required.

After the product has been screened to remove as much dust as possible, it should be discharged into a bin while still hot and allowed to cool slowly before further processing. This enables it to "anneal", thus making it less brittle and stronger than it would be if cooled more rapidly.

A small portion of the feed material will not expand. Since this unexpanded material degrades the insulating properties of the product, it must be removed. Most of the very light material has been separated from the product using an air classifier. This leaves approximately 20% of the product which contains a mixture of useful material and unexpanded heavies. Final separation of the heavies was accomplished in a flotation tank using water as the buoyant fluid. The light material floats while the heavies sink to the bottom where they may be removed by a conveyor or screw. Some of this material will expand during a second pass through the kiln. If it does not expand during the second pass, it is discarded as waste. This flotation method of separation must be performed after the product is cooled since it was found that rapid quenching shattered the closed cells thereby producing a weak and absorptive material.

BRIEF DESCRIPTION OF THE DRAWINGS

In the drawing:

FIG. 1 shows diagrammaticaly a kiln and associated structure as used in one embodiment of this process.

FIG. 2 is a partial diagrammatic view of a second embodiment.

FIG. 3 is a partial diagrammatic view of a third embodiment.

DETAILED DESCRIPTION

In carrying out this process, a kiln, indicated generally by 2, is utilized. The kiln includes a cylindrical shell 4 made of a suitable metal, e.g., carbon steel, provided with a lining 6 of firebrick backed up with insulation 7. The kiln, mounted for rotation on rollers 8, is provided with conventional supporting tires 10. As shown, the kiln is mounted on an incline and is provided at its upper end with a conventional feed chute 12 and at its lower end with a conventional pressurized burner 14. In addition, the lower end is provided with a secondary burner 26 or 26' as shown in FIGS. 1 or 2 or an entirely separate but shorter kiln with burner 26" is used for final expansion as shown in FIG. 3. The lower end of the primary kiln is closed by a stationary wall 20 through which extends a second dust feed chute 22. Discharge chute 24 is also provided.

In use in the embodiment of FIG. 1, a mixture of granulated obsidian having a size range of about ⅛ inch to ¾ inch and high-melting-point dust is fed through chute 12 at a uniform rate. Additional dust may be fed through chute 22 if needed to prevent sticking at the lower end of the kiln. The burner 14 is so adjusted that the temperature within the kiln 2 immediately before the blast from the secondary burner is in the range of 1800° F. to 1900° F. The secondary burner 26 is adjusted to produce a hot spot near the exit of the kiln of 2400° F. to 2500° F. Blast from burner 14 produces a current of hot gas upwardly through the kiln, carrying dust along with it. This dust is collected in the dust collector 16 and there may be further, more complete, collectors in or communicating with exhaust stack 18. Dust also adheres to the walls of the kiln and to the granulated obsidian, preventing the sticking of the latter to itself and to firebrick 6.

In the embodiment shown in FIG. 2, the secondary burner is positioned outside the lower end of the kiln 2 and discharges into and downwardly across the kiln. The operation is much the same as in the form shown in FIG. 1, except that the flame from the burner 26' does not have a component of flow directed toward the discharge end of the kiln 2, and so does not assist in the movement of the expanded obsidian.

In the embodiment of FIG. 3, the discharge chute 24 feeds the obsidian, which has been heated in kiln 2 over a period of about 15 to 30 minutes to a temperature of 1800° to 1900° F. to a second kiln 28 of the same wall structure as kiln 2 together with the dust. Pressurized burner 26" directs its flame into the feed end of kiln 28 in the direction of the discharge end. It heats the material to a temperature of 2400° to 2500° F. As the obsidian expands, it is swept along more rapidly than any which remains unexpanded. All the obsidian, and much of the dust, is discharged through the final discharge chute 24'. The hot combustion gases and some of the dust return through conduit 30 to kiln 2, where they assist in heating the obsidian.

Expanded obsidian with adhering dust is discharged through chute 24. It is screened on a rotating or vibrating screen to remove the loose dust. The obsidian, now expanded to between 20 and 25 times its original volume, is immediately discharged into a bin where it is allowed to cool slowly. The dust from the screen and from the dust collector can be recycled to chute 12, together with additional granulated obsidian, as well as to chute 22.

In a separate operation, flotation or some other process is used to separate out the unexpanded ore.

While we have described several embodiments of our process and apparatus in detail, it will be apparent to those skilled in the art that various changes can be made. We therefore wish our invention to be limited solely by the scope of the appended claims.

The embodiments of the invention in which a proprietary right or privilege is claimed are defined as follows:

1. A method of expanding obsidian utilizing one refractory-lined rotary kiln which comprises:
   (a) feeding finely divided obsidian into one end of such a kiln;
   (b) feeding anti-sticking dust into at least one end of said a kiln;
   (c) introducing a first pressurized flame into the other end of said kiln in the direction of said one end;
   (d) gradually heating said obsidian by said first flame to a temperature of about 1900° F; and
   (e) subjecting said obsidian to a second flame at a temperature of about 2400° F. to 2500° F. for a very few minutes.

2. A method as defined in claim 1, wherein said obsidian is gradually heated over a period of 15 to 30 minutes.

3. A method as defined in claim 1, wherein said obsidian is subjected to said second flame for a period of about 2 to 5 minutes.

4. A method as defined in claim 1, wherein said obsidian is subjected to said second flame in a second refractory-lined rotary kiln which receives said obsidian directly from said first-named kiln.

5. A method as defined in claim 1, wherein said second flame is directed transversly within said kiln near said other end thereof.

6. A method as defined in claim 1, wherein said second flame is directed toward said other end within said kiln near said other end thereof.

7. A method as defined in claim 4, wherein said second flame is a pressurized flame within said second kiln and directed toward the discharge end thereof.

8. A method as defined in claim 1, wherein dust is introduced at both ends of said kiln in order to prevent sticking.

9. A method as defined in claim 1, wherein said obsidian contains less than 1% combined water.

* * * * *